United States Patent [19]

Hartig

[11] 4,424,098

[45] Jan. 3, 1984

[54] FALLING FILM EVAPORATOR

[75] Inventor: Martval J. Hartig, Wilmington, Del.

[73] Assignee: E. I. Du Pont de Nemours and Company, Wilmington, Del.

[21] Appl. No.: 361,853

[22] Filed: Mar. 25, 1982

Related U.S. Application Data

[60] Division of Ser. No. 206,288, Nov. 12, 1980, Pat. No. 4,341,601, which is a continuation-in-part of Ser. No. 123,023, Feb. 20, 1980, abandoned.

[51] Int. Cl.³ ............................................. B01D 1/22
[52] U.S. Cl. ............................... 159/1 W; 159/13 R; 159/49; 202/173; 202/236; 203/89
[58] Field of Search ............... 165/116, 110, 166, 133; 159/13 R, 13 A, 13 B, 1 W, 49, 24 B; 202/205, 236, 173; 203/89, 10, 11, 24, 26

[56] References Cited

U.S. PATENT DOCUMENTS

| | | | |
|---|---|---|---|
| 3,227,630 | 1/1966 | Beckman | 202/236 |
| 3,757,856 | 9/1973 | Kun | 165/166 |
| 3,977,364 | 8/1976 | Wilhelmus et al. | 159/1 W |

*Primary Examiner*—Frank Sever

[57] ABSTRACT

An energy efficient falling film evaporator having a plurality of substantially vertical and equidistant heat exchange elements made of a synthetic polymeric material. Each evaporating surface is in contact with a liquid spreading means, and each heat exchange element is heated by steam having a condensation temperature slightly higher than the boiling point of the aqueous solution from which water is being evaporated. Steam formed by evaporation of water either is recompressed and reintroduced as heating steam in a single-stage process or is used as heating steam for another stage, operating at a lower temperature and pressure, in a multistage process. Heating steam condenses to fresh water, which is recovered. This process is operated at a lower temperature and pressure, in a multistage apparatus. Heating steam condenses to fresh water, which is recovered. This evaporator is operated at a low feed rate, preferably below 45 kg of incoming aqueous solution per linear meter of horizontal width of each evaporating surface, and is capable of providing a 50% fresh water recovery per pass from sea water. Higher recoveries are possible in the case of brackish waters and various industrial waters. The evaporator is useful in water desalination and purification.

6 Claims, 6 Drawing Figures

FALLING FILM EVAPORATOR

CROSS-REFERENCE TO RELATED APPLICATION

This is a divisional of my application Ser. No. 206,288, filed Nov. 12, 1980, now U.S. Pat. No. 4,341,601 which was a continuation-in-part of my application Ser. No. 123,023, filed Feb. 20, 1980 now abandoned.

BACKGROUND OF THE INVENTION

This invention relates to energy-efficient apparatus for the evaporation of water from solutions of mineral or organic materials in water, such as for example, sea water or brackish waters, hereafter sometimes referred to throughout this specification and claims as aqueous solutions.

In conventional water purification or desalination processes based on evaporation the major costs are divided approximately evenly between the cost of energy and the capital costs. Only small additional expenditures are required for operation and supplies. The energy efficiency of an evaporation process increases with decreasing temperature difference, $\Delta T$, between the condensing steam and the boiling aqueous solution. However, for practical reasons the usual water evaporation processes operate at relatively high $\Delta T$'s of at least 5° C. Equipment depending on nucleate boiling such as pot boiling, rising film evaporators and natural circulation evaporators requires a $\Delta T$ of at least 5°–8° C. for efficient operation but is not used in modern desalination plants. Falling film evaporators, forced circulation evaporators, and multistage flash units are capable in principle of performing well at low temperature differences, but no equipment that is both capital efficient and energy efficient has been proposed.

In order to maintain reasonable throughputs, it is necessary when operating at low $\Delta T$'s to increase the heat exchange surface areas. Since the usual evaporators are built of metal, the additional cost of such large surface elements (both materials and fabrication) is considerable.

Naturally, the additional weight and volume of such equipment also contribute to the capital costs since larger buildings are required. Finally, most metal heat exchanger elements corrode in contact with salt water and must be periodically replaced. Replacement of larger heat exchange elements costs more than replacement of smaller elements.

The decrease of the energetic efficiency of evaporators with decreasing $\Delta T$'s results from the increasing importance of the energy required for pumping the aqueous solution through the system as compared with the evaporation energy saved by operating at a lower temperature difference. The following table illustrates the energy consumption and the capital investment required for conventional evaporating units operating with ocean water at a 50% conversion. The data are calculated for a vapor compression falling film evaporator.

TABLE

| Condensation T °C. | T °C. | Evaporation Energy J × 10⁶/m³* | Pumping Energy J × 10⁶/m³* |
|---|---|---|---|
| 108** | 7 | 45 | 7 |
| 107** | 6 | 40 | 8 |
| 106** | 5 | 34 | 10 |
| 105 | 4 | 28 | 12 |
| 104 | 3 | 23 | 16 |
| 103 | 2 | 17 | 24 |
| 102 | 1 | 11 | 48 |

| Condensation T °C. | Total Energy J × 10⁶/m³* | Relative Investment For Same Production Rates |
|---|---|---|
| 108** | 52 | 0.9 |
| 107** | 48 | 1.0 |
| 106** | 44 | 1.2 |
| 105 | 40 | 1.5 |
| 104 | 39 | 2.0 |
| 103 | 41 | 3.0 |
| 102 | 59 | 6.0 |

*Based on 0.95 × 10⁶ J/m³ = 1 KWH/1000 gals
**Normal range or prior art operation.

The above table makes it obvious why vapor compression falling film evaporators are not ordinarily operated at $\Delta T$'s lower than 5° C. In a falling film evaporator, the higher pumping energy requirement is due to the necessity of maintaining a continuous liquid film on the evaporating surfaces, which requires high feed rates. When the flow of liquid is inadequate, dry spots appear on heat transfer surfaces, and ultimately rivulets form, rendering most of the surface inactive. For this reason, the presently available falling film evaporators are operated at high feed rates, usually about 1000–4000 kg per linear horizontal meter of evaporating surface, although with careful operation and excellent flow control it is possible to operate at feed rates as low as 600 kg per linear horizontal meter.

It thus is desirable to provide a less capital-intensive apparatus for more energetically efficient evaporation of aqueous solutions.

SUMMARY OF THE INVENTION

According to the present invention, there is now provided in a falling film evaporator comprising (A) a plurality of substantially vertical and equidistant heat exchange elements made of a film of a synthetic polymeric material, each heat exchange element having two evaporating surfaces and two heating surfaces, the heating surfaces being in communication with a heating steam inlet;

(B) a feeding means for delivering aqueous solution to be evaporated to the evaporating surfaces of the heat exchange elements;

(C) a liquid concentrate collection means for receiving and removing liquid flowing down from the bottom of the evaporating surfaces of the heat exchange elements;

(D) a steam compressing means communicating with water vapor formed on the evaporating surfaces of the heat exchange elements and with the heating steam inlet; and (E) a means for collecting fresh water formed by the condensation of heating steam in contact with the heating surfaces of the heat exchange elements;

the improvement of providing liquid spreading means being made of fibers or particles which are wettable or made wettable by water, said liquid spreading means having a horizontal spreading means component and a free area of at least 20%, and the spacing and dimensioning of the individual fibers or particles being such that the descending aqueous solution forms droplets which completely fill the voids, such that each liquid spreading means coacts with its closest outer heat exchange surface and with the flowing aqueous solution to form a stable, thin film over said outer heat exchange surface, thereby permitting even evaporation of water from each said surface without formation of either dry spots or rivulets even at a feed rate of the aqueous solution to be evaporated of less than 300 kg per linear horizontal meter of each outer heat exchange surface per hour, said feed rate always being higher than the evaporation rate of said solution.

DETAILED DESCRIPTION OF THE INVENTION

The process of the present invention can be operated as a single-stage, vapor compression distillation or a multiple-stage distillation. The latter mode of operation is more practical when cheap, low-pressure waste steam is available from another process, for example, from a power plant. The former is considered more practical for a free-standing, self-contained water purification installation. This process can be operated at a superatmospheric, atmospheric, or subatmospheric pressure. In a usual single-stage system, water evaporates at atmospheric pressure, while heating steam is fed at a slightly higher pressure, preferably not over 115 kPa, usually not over 180 kPa. In this manner, simple equipment, such as a blower, can be used for steam recompression, and only a small amount of energy is expended in this step. In a multi-stage process, steam formed in the first stage is used as the heating medium in the second stage, which is operated at a lower pressure, and steam formed in the second stage is used in the third stage, which operates at still lower pressure, etc.

Figure 1:
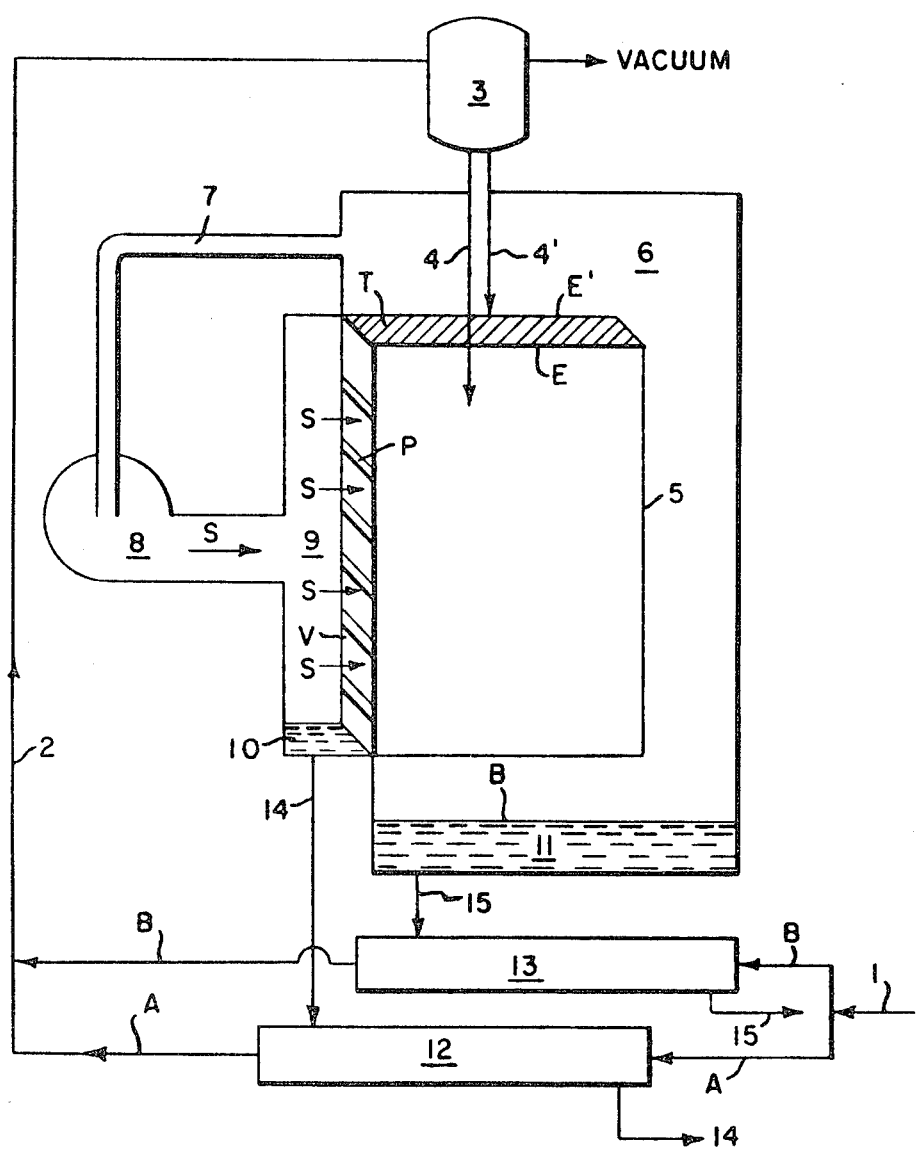
FIG. 1 is a schematic flow sheet for a single-stage water evaporation process of the present invention.

Referring now to FIG. 1, aqueous solution is introduced at 1 and is split into streams A and B, which are passed, respectively, through preheaters 12 and 13. Preheater 12 is heated by hot fresh water recovered downstream, while preheater 13 is heated by hot liquid concentrate remaining after evaporation of water from the initial aqueous solution. Streams A and B are combined and piped through line 2 to deaerator 3 operating at a slightly reduced pressure, and the solution is fed in streams 4 and 4' to the outer heat exchange surfaces (or evaporating surfaces) E and E' of heat exchange element 5. The inner heat exchange surfaces are spaced from each other by multiple protuberances or pegs P formed in one of the plastic sheets of heat exchange element 5. Both the top T of heat exchange element 5 and the bottom B, not shown, are closed. Each of evaporating surfaces E and E' is in intimate contact with a liquid spreading means, not shown.

Aqueous solution delivered to surfaces E and E' flows down as a film. Water evaporates as steam, which enters housing 6 and thence is piped through line 7 to blower 8, which compresses it to a slight overpressure (for sea water, about 107 kPa).

Compressed steam enters header 9, then is directed to the open space V between heat exchange element sheets. The direction of steam is shown by arrows and letters S. Steam condenses to hot fresh water 10, which is removed through line 14 and preheater 12. This water normally does not require further purification. Liquid concentrate 11, which drips from the evaporating surfaces E and E', is collected and passed through line 15 and preheater 13, then disposed of. In an actual evaporator, there is a large number, or a stack, of such heat exchange elements arranged in substantially equidistant fashion, as discussed below.

Naturally, modifications of this process can be made without departing from the spirit of this invention. For example, instead of two preheaters 12 and 13, one can use a single preheater, which is heated simultaneously by hot fresh water and hot liquid concentrate. Hot fresh water, instead of being used directly in a preheater, may be flashed to generate steam, which serves as a heating medium in the preheater. Additional heat may be introduced from a different source, if desired. Instead of heat exchange elements made from plastic sheets, one can use heat exchange elements made from plastic bags, as will be explained below. All such or other obvious modifications are intended to be within the scope of this invention.

Similarly, when the apparatus of this invention is used for the purification of brackish water or for redistillation of fresh or distilled water, rather than for desalination of sea water, the volume of liquid concentrate will be much smaller perhaps 10% of the feed or less. In such cases, it may not be economically attractive to recover the heat of liquid concentrate in the above-described manner.

Figure 2:
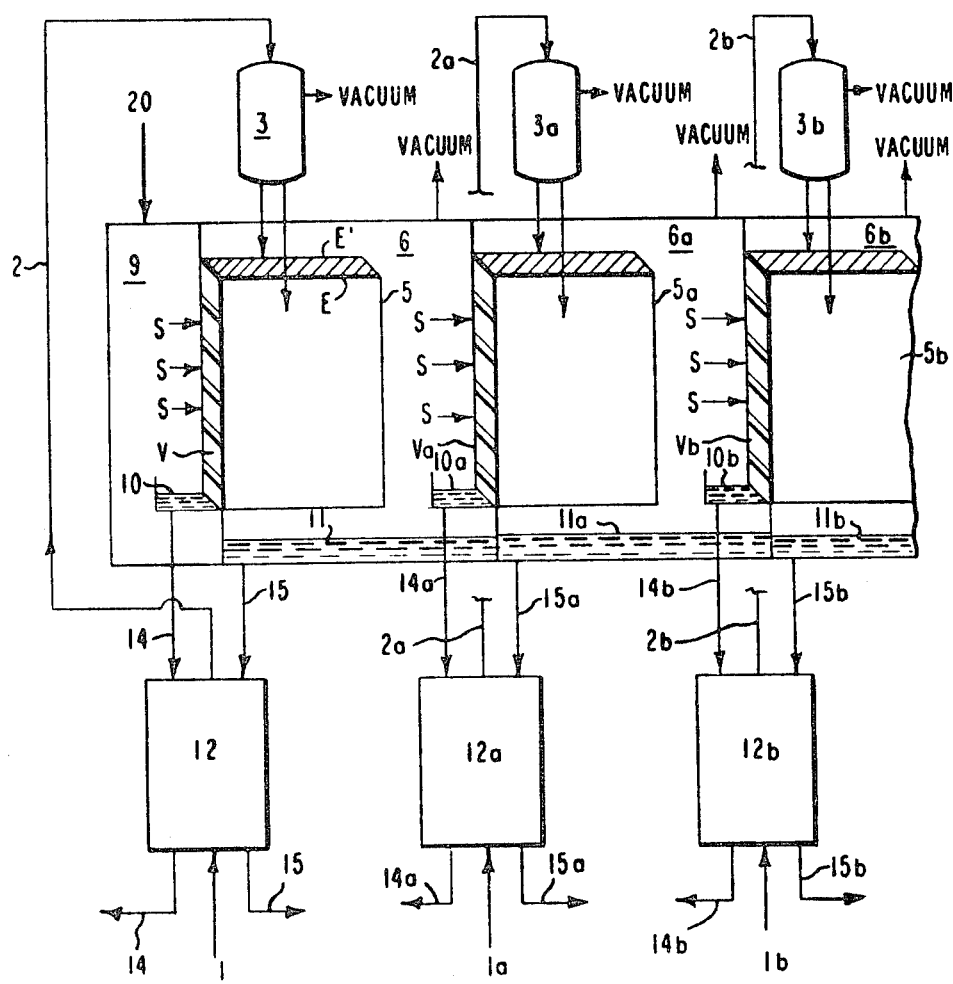
FIG. 2 is a schematic flow sheet for a multiple-stage process of the present invention.

A multi-stage operation is schematically shown in FIG. 2.

Aqueous solution (for example, sea water) 1 is fed into preheater 12, then is piped through line 2 to deaerator 3 and flows onto the evaporating surfaces E and E' of heat exchange element 5, maintained at a subatmospheric pressure. Waste steam 20 from an industrial source (for example, from an electric power plant) enters plenum chamber 9 and flows into the hollow space V inside heat exchange element 5. Water evaporating from the aqueous solution forms steam, which enters housing 6 and thence the hollow space Va of heat exchange element 5a. Initial waste steam condensed in heat exchange element 5 forms fresh water 10, which is recovered through preheater 12. Liquid concentrate (for example, waste brine) 11 is passed through pipe 15, then preheater 12, and is disposed of. Fresh aqueous solution 1a is pumped through preheater 12a and line 2a (shown only in part) to deaerator 3a, then onto the evaporating surfaces of heat exchange element 5a maintained at a lower pressure than heat exchange element 5. Steam condensing within heat exchange element 5a is recovered as hot fresh water 10a through preheater 12a, and waste brine 11a is passed through pipe 15a, then preheater 12a and disposed of. Steam formed by evaporation of water from the surfaces of heat exchange element 5a is used as the heating medium for element 5b, which is maintained at a lower pressure than heat exchange element 5a. Naturally, each stage has a large number of heat exchange elements, although only one is shown for each stage for clarity. This process can be repeated through any convenient number of stages. Typically, waste steam 20 will have a condensation temperature of 55° C.; steam in chamber 6, 53° C.; and steam in chamber 6a, 51° C. The corresponding pressures are 15.7 kPa, 14.3 kPa and 12.9 kPa, respectively.

It will be noted that this multi-stage process is not operated in series but in parallel, that is, the initial aqueous solution is passed through the system only once, rather than being recovered from one stage and sent for further distillation to the next stage. This is possible because of the high efficiency of the present system, whether single or multiple-stage, which can produce at a very small expenditure of energy high quality fresh water at a high conversion per pass. Accordingly, further purification of the liquid concentrate is unnecessary and would in fact be uneconomical because of the high concentration of solids obtained after one pass. However, there is no theoretical reason why a multi-stage process could not be operated in a series. This might be done, for example, for brackish waters or others having fairly low solids contents.

Figure 3:
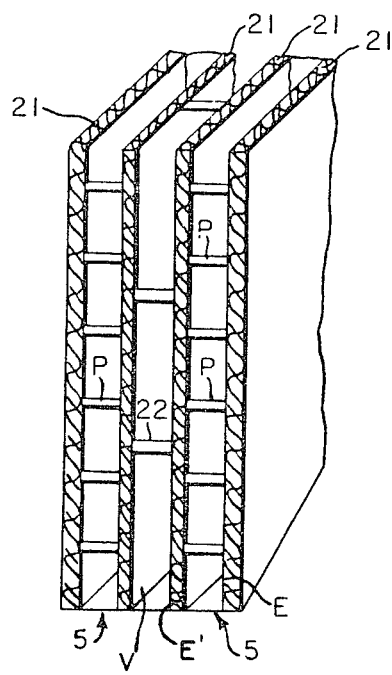
FIG. 3 is a schematic representation of an end view of a falling film evaporator consisting of parallel sheets.

FIG. 3 is a schematic cross-sectional end view of a stack of two heat exchange elements 5 formed of plastic sheets separated by separators or pegs P. Liquid spreading means 21 come in close contact with the outer surfaces E and E' of the sheets, but the liquid spreading means of adjacent heat exchange elements are not in contact with one another but are held apart by separators 22 so as to leave an open space V. In a falling film evaporator of this type, the ends of the stack are closed by a header, not shown, which has openings communicating with the inside of each heat exchange element, so that steam may be introduced therein. There never is any direct contact between the heating steam and either the evaporating aqueous solution or the steam formed by water evaporation therefrom.

Figure 4:
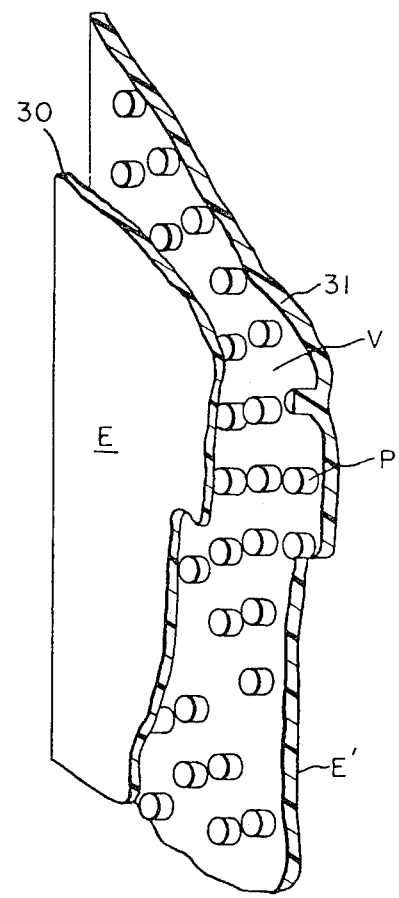
FIG. 4 is a partial cross-sectional view of an evaporator sheet assembly.

The construction of a preferred type of a heat exchange element of this invention is shown in FIG. 4. Plastic sheet 30 is flat, while plastic sheet 31 has protuberances or pegs P molded into its surfaces. These serve as heat exchange element's spacers. The two sheets spaced apart by pegs P define hollow space V into which steam is introduced during the operation. Aqueous solution is evaporated from the outer surfaces E and E'.

Figure 5:
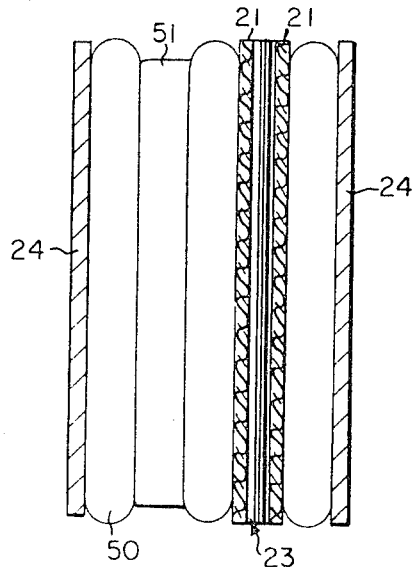
FIG. 5 is a schematic end view of a falling film evaporator consisting of parallel bags.

FIG. 5 is a cross-section of a bag-type falling film evaporator. Alternating bags 50 and 51 are joined to one another on top and bottom. Bags 50 are sealed on top and bottom but have open sides. Bags 51 are open on top and bottom but have sealed sides. A plastic supporting means 23, which has a liquid spreading means 21 in contact with each of its surfaces is slipped into each one of bags 51. In this drawing, one of the bags 51 is shown emtpy, while the other bag 51 is shown having the supporting means 23 and the liquid spreading means 21 inserted therein. The complete stack of bags 50 and 51 is constrained by end steel plates 24. In operation, heating steam is introduced into bags 50, while aqeous solution to be evaporated flows down the sides of bags 51. Steam formed by water evaporation is removed through the top and bottom of bags 51, while liquid concentrate is collected at the bottom. Fresh hot water formed by condensation of heating steam is removed at the far end of bags 50.

Figure 6:
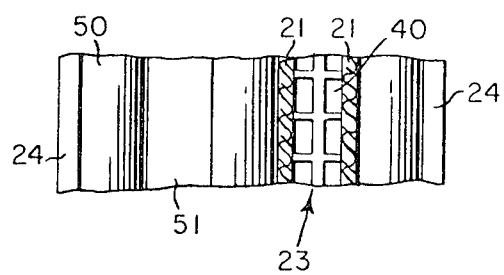
FIG. 6 is a fragmentary top view of a falling film evaporator consisting of parallel bags.

FIG. 6 is a top view of the stack of FIG. 5. The supporting means 23 shown in this particular embodiment is made of two polyethylene sheets having parallel channels 40 embossed into one surface and placed back-to-back so that the channels are on the outside running from the top to the bottom. This arrangement provides open space for water evaporation and steam removal. Naturally, equivalent supporting means of different design may be used. The only requirement is that they offer sufficient mechanical support and provide adequate free space for steam to move vertically. The meaning of the reference numerals is the same as in FIG. 5.

The plastic material from which the heat exchange elements, whether sheets or bags, are made must have sufficient mechanical strength and must be resistant to corrosion or hydrolysis under the operating conditions. Suitable polymeric materials for this purpose include polyolefins, especially polyethylene and polypropylene; halogenated polyolefins such as polytetrafluoroethylene; halogenated vinyl polymers such as polyvinyl fluoride, polyvinylidene fluoride, and chlorinated polyvinyl chloride; polysulfones; and polyphenylene oxides. Polyethylene is the preferred heat exchange element material because of its ready availability, low price, good thermal conductivity, and ease of fabrication. Cellulosic materials, polyesters, and polyamides would have a very limited life in this application.

The plastic film preferably is 1.25 to $25 \times 10^{-2}$ mm thick and may be oriented, either uniaxially or biaxially. A $2.5-5 \times 10^{-2}$ mm thick oriented polyvinyl fluoride film is a very good material which is more resistant to oxidation and to attack by trace amounts of aromatic hydrocarbons occasionally present in feed water than polyolefins.

When the heat exchange elements are in the form of bags, the bags may be formed from a tubular blown film of proper diameter or from flat film by heat sealing, cementing, or mechanical closure. Each bag is constrained to a thickness of less than about 1.25 cm, usually 0.125–0.4 cm. The length of the bag (the vertical dimension) is at least 10 times, usually hundreds to thousands times, greater than its constrained thickness. The width of the bag (the horizontal diiension) is hundreds to thousands times its constrained thickness.

The length of heat exchange elements will vary with the size of the plant. Usually, it will be less than about 6 m, but the height of a falling film evaporator has no theoretical limitation. Either longer elements can be used, or shorter elements can be stacked to any desired height. A practical sheet or bag size is about 2.5 m vertical by 1.25 m horizontal. The supporting means used in conjunction with bag-type heat exchange elements usually will be made of a plastic material, which may be of the same composition as the bags themselves but must be sufficiently rigid to provide good mechanical stability. The supporting means may be in the form of an open framework or matrix. In such a case, its density should be less than about 30% of a solid sheet of the same material of the same thickness. The solid portions of the supporting means should be so placed that they would offer the least resistance to the movement of aqueous solution and of steam.

The purpose of the liquid spreading means is to maintain the evaporating surfaces uniformly wet at all times, without localized dry areas. The liquid spreading means can be made of many types of materials, including cotton, acrylic fibers, asbestos, glass, carbon, or polyolefins which either are wettable by water or have their surfaces treated to make them wettable by water. They may be in the form of woven or nonwoven cloth or may be adhered to the heat exchange element surface as fiber bundles having a substantial proportion of the fibers in the horizontal direction. Other finely divided materials may be adhered to the surface to provide liquid spreading action, for example, ground silica gel; or the surface of the heat exchange element may be roughened to provide better wettability. An effective liquid spreading means must have a free area of at least 20%. A cheesecloth having about 20 count by 16 count is a good liquid spreading means. If the open area is too large, however, good liquid spreading action will not be achieved because the surface tension of the descending liquid may not be sufficient to form droplets completely filling the voids.

Cloth liquid spreading means are very useful in this application because they can be easily inserted and removed and are readily available at a low cost, especially cotton and acrylic fiber cloths. Since solid material may separate from the aqueous solution in the operation of the present process, and most of that solid material collects on the surface of the liquid spreading means, a cloth liquid spreading means is practical because it can be removed for cleaning or laundering and reused or replaced without damage to the heat exchange element or disassembly of the equipment. Cheesecloth and shade cloth seem to be the most suitable weave types because they cling to the surface of a heat exchange element, and the interstices between fibers remain filled with a thin film of water. Broadcloths and flannels, although having good liquid spreading properties, tend to trap steam pockets which, of course, is undesirable.

The effectiveness of a liquid spreading means can be determined by placing the liquid spreading means vertically in intimate contact with a sheet or film of the same material which is used for heat exchange elements, forming a lower edge of the above assembly with pinking shears, and applying water to the upper edge of the assembly at one point approximately in the center of the upper edge. The droplets coming off the individual points along the bottom edge during a given time interval are counted. If those numbers are nearly identical for all the individual points, the liquid spreading means is considered effective for that feed rate. Both the minimum and the maximum effective feed rates should be known for each type of liquid spreading means and will vary for different types.

This process is especially suitable for the desalination of sea water and purification of brackish waters and industrial waste waters. Waters containing 1 ppm to about several percent of total dissolved solids can be purified. The system is quite practical for aqueous solutions which yield a liquid concentrate of about 10% of solids or less. The process is preferably operated at atmospheric pressure, although higher pressures, up to about 2 atmospheres, are possible. The increased capital investment and maintenance and labor costs may make such a higher pressure operation economically unattractive. The flow rate of the incoming aqueous solution normally is below 150 kg per linear meter and preferably below about 45 kg per linear meter of the width of each evaporating surface per hour. This is much less than in prior art falling film evaporators but is highly desirable because at this slow feed rate water is evaporated from the original solution at high efficiency so that a recycle usually is not necessary. This eliminates a need for pumping and recirculating equipment and reduces the overall energy requirements. The feeding equipment must be capable of operation at this very slow rate. An effective feeding system may be made of a number of layers of cheesecloth hung over lips of a series of interconnected closely spaced troughs. The water solution in the troughs is conveyed over the tip in a uniform fashion to wicks sandwiched between the supporting means and the liquid spreading means of the heat exchange elements. Normal pumps or spraying devices also can be used but have been found to be less convenient to use or trouble-free.

The thin plastic heat exchange elements used in the falling film evaporators of this invention can be packed very efficiently and economically so that a total active evaporating area per given volume is exceptionally high. Because of this, a falling film evaporator can evaporate in this process a large amount of water in a given time interval in spite of the fact that the incoming aqueous solution is fed at a very slow rate. It is both feasible and practical to pack, for example, 150–300 heat exchange elements into one stack. Although plastic film has a sufficient heat conductivity for the purpose of this invention, it would not be practical to attempt water evaporation from aqueous solutions without using liquid spreading means. However, in their presence, smooth and efficient water evaporation is possible. For a single-stage operation, it is practical to carry out the process at atmospheric pressure on the water evaporation side. For sea water, which has a boiling temperature of 100.6° C., heating steam would have to be compressed to about 107.5 kPa and would have a condensation temperature of about 101.8° C. For brackish water, which boils at about 100° C., it would be sufficient to compress steam to about 104.8 kPa. Such steam would condense at about 101.° C. At 115.1 kPa steam pressure, which is considered maximum economically practical, its condensation temperature is about 103.5° C.

As the boiling point of the aqueous solution flowing down the evaporating surfaces of the heat exchange elements increases in the downward direction with the increasing concentration of the solution, there exists in fact a boiling point range. The average $\Delta T$ then is calculated as the difference between the condensation temperature of heating steam on one side of the heating element and the average boiling temperature of the aqueous solution on the other side. This average temperature is based on the difference between the top and the bottom of heat exchange elements. Normally a temperature difference, $\Delta T$, between the heating steam and the boiling temperature of the aqueous solution feed of more than about 2° C. is not economically attractive, except when a cheap energy source, such as waste steam or waste heat, is available. Usually, waste steam is available at a fairly low pressure, and in that case it is practical to operate a multistage process schematically illustrated in FIG. 2. An installation of this type might have, for example, 10 stages. However, the multistage process can also be run with high pressure steam, for example, at 175 kPa. This permits the use of a larger number of stages. The steam pressure gradually falls from about 175 kPa to about 2 kPa, usually from 103 kPa to 7 kPa. The pressure in each stage is adjusted to obtain the desired $\Delta T$. But for a free-standing plant, the single-stage vapor compression system illustrated in FIG. 1 is more practical.

It may be practical to run the multi-stage process with only about 2–12 stages, then to compress steam formed in the last stage and use it as heating steam for the first stage.

Because of the very critical temperature and pressure relationships in the operation of the process of the present invention, it is necessary to remove noncondensible gases, especially air, from the system. For this reason, the incoming aqueous solution always is deaerated. Sometimes, additional vacuum is applied to the heating steam plenum; or the heating steam can be introduced at a slight overpressure, and a small portion of it bled off to remove noncondensibles.

The process of this invention is now illustrated by the following examples:

EXAMPLE 1

A single-bag falling film evaporator was constructed from $5 \times 10^{-2}$ mm "Tedlar" (Du Pont polyvinyl fluoride) film, cotton cheesecloth 32-30 count, and polyethylene ribbed sheeting.

Two pieces of "Tedlar" film 13 in. square, 33×33 cm, were heat sealed together on all four sides using an impulse sealer to give a closed bag 30.5×30.5 cm. Two holes 2 cm in diameter were cut in one film face, one in the upper righthand corner and one in the lower lefthand corner. These were equipped with brass ports sealed with rubber gaskets in a manner similar to tire valves used in conventional inner tubes. Two aluminum plates 36×36 cm were provided with spacer posts with 0.5 cm separation on each of the four corners and suitable holes drilled in one plate to accept the brass ports. A polyethylene ribbed sheet was cemented to the inside of each of the plates with the ribs projecting toward the center. The ribbed sheet was 1.25 mm thick overall with a skin 0.125 mm thick and ribs 0.2 mm thick and 1.15 mm high spaced on 3.2 mm centers. Loose pieces of cotton cheesecloth were cut to size to fit over the ribbed sheet and project about 2.5 cm above and below the ribbed sheet. The separate pieces were assembled to form a one-bag falling film evaporator. Wetting the cheesecloth caused it to cling to the "Tedlar" surface and eliminated all wrinkles.

The lower port was equipped with a variable pressure steam source and an outlet for product water, each controlled by variable water legs. The upper port was equipped with a variable water leg and served to allow the escape of excess steam and flush noncondensibles from the system. Because of the area covered by the ports and the layer of product water in the bottom of the bag, the effective area available for heat transfer was reduced from 0.19 $m^2$ to 0.16 $m^2$.

The entire unit was immersed in a box filled with saturated steam to prevent heat loss or gain to the unit. Boiling tap water was fed to the top of the bag unit through a 6 mm stainless steel tube 30.5 cm long with small holes drilled on 5 cm centers and covered with a cheesecloth wick which dropped down to engage the cheesecloth liquid spreading means projecting from the single-bag unit.

The unit was tested at various pressures from 2.66 kPa to 7.98 kPa above atmospheric. In operation, the feed water was adjusted to a flow rate of about 20 $mL^3$/min., corresponding to about 4 kg per linear meter per hour, and the various legs adjusted to give automatic operation for steam inlet pressure control and water takeoff and the outlet pressure adjusted to give a small flow of steam out of the bag to flush out any noncondensibles. The test results obtained are as follow:

| Pressure in Bag kPa above Atmospheric | Calculated ΔT °C. | Productivity mL H$_2$O/min |
| --- | --- | --- |
| 2.66 | 0.8 | 6.5 |
| 3.60 | 1.0 | 7.3 |
| 6.0 | 1.6 | 10.4 |
| 6.67 | 1.8 | 11.5 |
| 7.73 | 2.1 | 16.0 |

Following the test, the unit was put on continuous unattended operation at 7.3 kPa above atmospheric pressure in the bag. Productivity remained at the level of 14–15 mL/min. for a period of twenty days; over the next several days productivity decreased to about 12 mL/min. After a total of 27 days of operation the unit was shut down. Examination of the unit showed a large amount of a brownish-white solid calcium carbonate contaminated with rust. Nearly all the solid was in the cheesecloth. The bag as removed was clean. Small accumulation of solid was noted in some areas of the ribbed sheeting. The solid was easily removed by rinsing with dilute sulfuric acid providing a soft regenerated liquid spreading means visually indistinguishable from the original liquid spreading means. The heat transfer coefficient of this falling film evaporator under the test conditions was 1400 W/$m^2$.K.

EXAMPLE 2

With the success and promise of the single-bag unit, a larger five-bag unit was built using the same materials as in Example 1.

The bags (about 36×74 cm) were made by an overlap heat seal in the long direction and ultimately closed on the ends with a reinforced heat seal. The bags were then sealed alternately face to face using a narrow band closed hot plate seal to form seals 2.5 or 5 cm wide with circular ends to form pockets between the bags 25 cm wide running the length or the bags. Two pockets were formed between each set of bags using three face-to-face seals. The center seal area served to carry the inlet steam ports and the product water port while the two-edge seal areas carried the noncondensible and excess steam ports. Holes were cut within the seal area between adjacent bags to open up the inside of the bags fully to each other. Ports similar to those used in the one-bag unit were inserted in one outside film while the other outside film was left uncut to hold the pressure. The support matrix was formed from two pieces of ribbed sheet heat sealed together back-to-back and cut to size to fit in the pockets and project about 2 cm beyond the pocket. These units were covered with the cheesecloth and inserted into the pockets. The entire unit was placed between suitable aluminum support plates. Feeding wicks made of folded cheesecloth about 1.25 cm×0.25 cm×30.5 cm long were inserted between the top edge of the bags and the protruding plastic matrix covered with cheesecloth. The unit was put in a steam-filled box and feed controls attached in the same manner as for the single-bag unit. This unit had an effective heat transfer area of about 1.5 $m^2$, about 10 times that of the single-bag unit.

The unit was put in operation at a feed rate of about 2.5 kg per linear horizontal meter of evaporating surface and a pressure differential of 7.4-8 kPa over atmospheric, which corresponds to a ΔT of about 2.1° C. Productivity over a continuous, largely unattended period of 2000 hours with occasional acid washing varied from 100 to 120 mL per minute during this time or about 38 mL/min./m²/° C.

After about ten days of operation, productivity had declined about 10%. At this time the containing box was opened and the cheesecloth rinsed with 8 liters of 2% sulfuric acid. After washing, productivity increased to the original level. Other techniques such as adding the acid to the feed tray, stopping the unit for one-half hour and removing and separately washing the liquid spreading means, and spraying acid solution on the liquid spreading means were done at roughly ten-day intervals with restoration of the initial rate in all cases. This shows that intermittent descaling can be practiced in many ways to insure long, high efficiency operation of the unit.

After some 2000 hours of operation the unit was shut down and disassembled.

EXAMPLE 3

A 150 mm by 150 mm plastic sheet falling film evaporator element was made from a hollow linear polyethylene structure consisting of two flat sheets 0.1 mm thick held apart by channel-forming ribs 0.2 mm wide and 1 mm high on 3 mm centers running the length of the sheet. The "sandwich" construction was similar to that of the heat exchange element represented in FIG. 4, except that sheets 30 and 31 were separated by ribs, rather than by pegs, and that the unit was formed of a single piece. This element was placed so that the channels were vertical. Both the top and bottom ends were connected to headers of welded polyethylene in communication with all the channels. The entire top header and surface of the evaporator were covered with a spreading means of cotton cheesecloth with 32×30 count. The top header was equipped with an entry port for condensate. The total active evaporation surface was 0.05 m².

The falling film evaporator was placed on the test stand of Example 1 with the steam inlet hooked to the top header and the condensate collection system connected to the bottom header. It was tested at a pressure of 6.7 kPa above atmospheric with a calculated $\Delta T$ of 1.8° C. The feed of hot water to the outside of the module was varied from 3 to 10 kilograms per hour per horizontal meter of each evaporating surface. Production of the active area was 5 mL/minute. This was calculated to give an overall heat transfer coefficient of 1700 W/m².K, which is somewhat higher than that of Example 1. The overall heat transfer coefficient was independent of the flow rate over the range studied.

I claim:

1. In a falling film evaporator comprising
(A) a plurality of substantially vertical and equidistant heat exchange elements made of a film of a synthetic polymeric material, each heat exchange element having two evaporating surfaces and two heating surfaces, the heating surfaces being in communication with a heating steam inlet;
(B) a feeding means for delivering aqueous solution to be evaporated to the evaporating surfaces of the heat exchange elements;
(C) a liquid concentrate collection means for receiving and removing liquid flowing down from the bottom of the evaporating surfaces of the heat exchange elements;
(D) a steam compressing means communicating with water vapor formed on the evaporating surfaces of the heat exchange elements and with the heating steam inlet; and
(E) a means for collecting fresh water formed by the condensation of heating steam in contact with the heating surfaces of the heat exchange elements;
the improvement of
providing liquid spreading means being made of fibers or particles which are wettable or made wettable by water, said liquid spreading means having a horizontal spreading means component and a free area of at least 20%, and the spacing and dimensioning of the individual fibers or particles being such that, when said evaporator is in use, the descending aqueous solution forms droplets which completely fill the voids, such that each liquid spreading means coacts with its closest outer heat exchange suface and with the flowing aqueous solution to form a stable, thin film over said outer heat exchange surface, thereby permitting even evaporation of water from each said surface without formation of either dry spots or rivulets even at a feed rate of the aqueous solution to be evaporated of less than 300 kg per linear horizontal meter of each outer heat exchange surface per hour, said feed rate always being higher than the evaporation rate of said solution, and said feeding means being sized sufficient to provide said feed rate.

2. A falling film evaporator of claim 1 wherein the heat exchange elements are constituted of parallel sheets spaced from each other.

3. A falling film evaporator of claim 1 wherein the heat exchange elements are constituted of alternating plastic bags sealed to one another on top and bottom, the first set of alternating bags being closed on top and bottom and open in front and back, while the second set of alternating bags being open on top and bottom but closed in the front and back, supporting means being placed in the bags of the second set, each supporting means being in intimate contact with the liquid spreading means throughout substantially each of its surfaces, and the bags of the first set being in contact with a heating steam inlet at one end and with fresh water collecting means at the other end; the two sets of alternating bags forming a vertical stack held in a substantially constrained form by end holding means.

4. In a multi-stage falling film evaporator wherein each stage comprises
(A) a plurality of substantially vertical and equidistant heat exchange elements made of a film of a synthetic polymeric material, each heat exchange element having two evaporating surfaces and two heating surfaces, each heating surface being in communication with a heating steam inlet;
(B) a feeding means for delivering aqueous solution to be evaporated to the evaporating surfaces of the heat exchange elements;
(C) a liquid concentrate collection means for receiving and removing liquid flowing down from the bottom of the evaporating surfaces of the heat exchange elements; and
(D) a means for collecting fresh water formed by the condensation of heating steam in contact with the heating surfaces of the heat exchange elements;
the arrangement of the successive stages being such that the heating surfaces of the heat exchange elements of each successive stage are in communication with steam formed by evaporation of water from the evaporating surfaces of the heat exchange elements of its preceding stage, the first stage receiving steam either from an outside source or, after compression, from the last stage;

the temperature and pressure of each successive stage being lower than that of its preceding stage and being such that water boils from the aqueous solution at each stage;

the improvement of providing liquid spreading means being made of fibers or particles which are wettable or made wettable by water, said liquid spreading means having a horizontal spreading means component and a free area of at least 20%, and the spacing and dimensioning of the individual fibers or particles being such that, when the evaporator is in use, the descending aqueous solution forms droplets which completely fill the voids, such that each liquid spreading means coacts with its closest outer heat exchange surface and with the flowing aqueous solution to form a stable, thin film over said outer heat exchange surface, thereby permitting even evaporation of water from each said surface without formation of either dry spots or rivulets even at a feed rate of the aqueous solution to be evaporated of less than 300 kg per linear horizontal meter of each outer heat exchange surface per hour, said feed rate always being higher than the evaporation rate of said solution, and said feeding means being sized sufficient to provide said feed rate.

5. The falling film evaporator of claim 1 or 4 in which the film of which the heat exchange elements are made is made of polyethylene or polyvinyl fluoride.

6. The falling film evaporator of claim 1 or 4 wherein the liquid spreading means are in close contact with the evaporating surfaces of the heat exchange elements adjacent thereto.

* * * * *